April 29, 1941.   R. R. CHAPPELL   2,240,390
AUTOMATIC CONTROL DEVICE
Filed Nov. 22, 1938
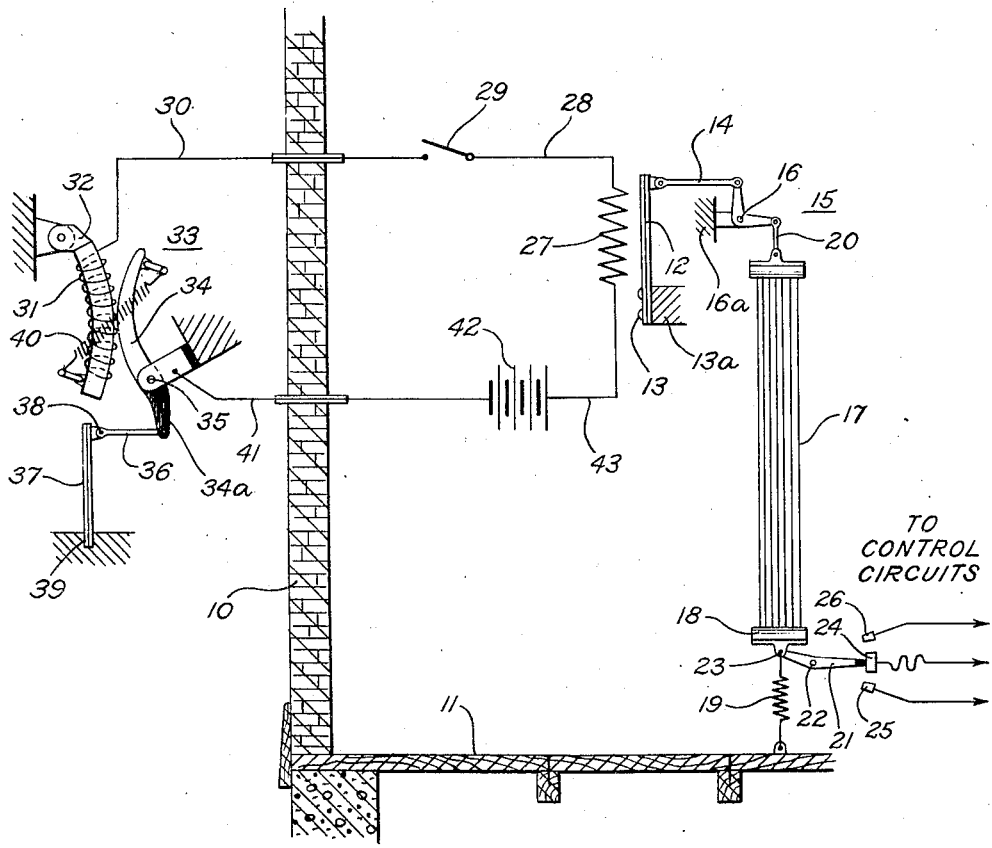
INVENTOR.
Ralph R. Chappell
BY Stephen Cerstvik
ATTORNEY.

Patented Apr. 29, 1941

2,240,390

UNITED STATES PATENT OFFICE 2,240,390

AUTOMATIC CONTROL DEVICE

Ralph R. Chappell, Richmond, Va., assignor to Bendix Aviation Corporation, South Bend, Ind., a corporation of Delaware Application November 22, 1938, Serial No. 241,872

4 Claims. (Cl. 236—44)

The present invention relates to automatic control devices and more particularly to novel means for automatically controlling comfort conditions in an air conditioned area.

Such a comfort condition has been designated by the American Society of Heating and Ventilating Engineers as the "effective temperature" and is defined as an experimentally determined temperature which, unlike the dry-bulb and wet-bulb temperatures, is a true indication of a person's feeling of warmth in all combinations of temperature, humidity and air motion. Reference is made to pages 313 to 340 inclusive, of the 1933 Guide of the American Society of Heating and Ventilating Engineers, for details as to how "effective temperature" tables have been arrived at and their relation to a feeling of comfort by the human body. In other words, the comfort condition is a physiological condition pertaining to the reaction of the human body to the particular conditions of temperature and humidity maintained within a room. While the temperature per se may be higher or lower in actual degrees than those which we have been accustomed to consider as comfortable, the humidity is so proportioned to the particular temperature that the human body feels neither warm nor cold but "just right."

The novel means embodying the invention are particularly adapted for controlling air-conditioning systems having either heat supply means, moisture supply means, cooling means or de-humidifier means, whereby one or the other of said supplies or means may be varied in order to maintain conditions of comfort in an enclosure.

The invention embodies a novel combination of means responsive to humidity and temperature, whereby comfort conditions are maintained within an enclosure regardless of the humidity and temperature changes within said enclosure and the temperature changes outside thereof.

More specifically the device embodying the invention is provided for the purpose of varying the supply of a heated or a cooled medium to the interior of an enclosure, said variation being controlled by a combination of the conditions within and without said enclosure, whereby a condition of comfort is produced and/or maintained within said enclosure.

Similar devices of the prior art have been utilized whereby the heat supply to an enclosure such as a room, for example, has been controlled in response to changes in temperature within and without said enclosure. If, for example, the temperature within an enclosure, such as a room in a building, were maintained by heat supply means controlled by means responsive to the temperature within the room and the temperature responsive means were, in turn, controlled by means responsive to the outdoor temperature, such a combination would increase the heat supply to the room if the outside temperature fell but the heat supply would be increased regardless of the comfort conditions within the room, i. e., without regard to the amount of moisture or percentage of relative humidity within the room. For example, as often occurs during winter heating of a room, the humidity within the room may be low due to lack of humidifying facilities and due to the high temperature to which the outside air has been heated. Under such conditions the heat supplied would be controlled solely in proportion to the inside temperature modified by the effect of the outside temperature, but enough heat would not be supplied to make up for the deficiency of humidity and the room would feel cold to the occupants thereof. If, however, the room thermostat were manually set to a higher point to provide enough heat at the particular humidity, the device would no longer operate satisfactorily when humidity conditions changed, and the device would have to be manually re-set again.

On the other hand, however, if we assume that humidifying means of some sort are provided within the room, the air supplied to the room is generally taken from the outside and the humidity conditions of said air supply vary with the humidity conditions of the outside atmosphere. If we assume that the room thermostat has been set at a particular point in order to create a comfort condition during a cold, dry day, as soon as a humid day is encountered, the temperature maintained by the thermostat would create a temperature that would be insufferably hot on such a humid day.

In view of the above disadvantageous conditions prevailing in systems of the prior art, one of the objects of the present invention is to provide a novel air-conditioning control system wherein comfort conditions of a room are maintained regardless of outside changes in temperature and inside changes of humidity.

Another object is to provide novel means whereby the heat supplied to a room is decreased as the humidity increases and whereby the heat supply is increased or maintained constant as the outside temperature decreases, depending upon the humidity conditions within the room.

A further object of the invention is to provide novel means whereby the heat supply of a room is increased when the outdoor temperature decreases at certain values of humidity within the room and of temperature outside thereof but is maintained constant or is decreased at decreasing outside temperatures and different humidity values within the room.

Still another object is to provide a novel combination comprising means responsive to indoor humidity for controlling the heat supply to a room, and means responsive to outside temperature for modifying said control.

A further object of the invention is to provide a novel combination comprising means responsive to indoor temperature for controlling the heat supply to a room, and means responsive to outside temperature and to inside humidity for modifying said control.

Still a further object is to provide means responsive to temperature for controlling the heat supply to a room, means responsive to humidity for varying said control, and means whereby the relative effect of said temperature responsive means and said humidity responsive means may be varied.

The above and other objects and advantages of the invention will appear more fully hereinafter from a consideration of the detailed description which follows, taken together with the accompanying drawing wherein is illustrated one embodiment of the invention. It is to be expressly understood, however, that the drawing is intended for the purposes of illustration and description only and is not designed as a definition of the limits of the invention, reference being primarily had for this purpose to the appended claims.

The single figure of the drawing represents diagrammatically an embodiment of applicant's novel control system.

While the invention is shown as applied to a room in a house or building, it is to be expressly understood that the novel control means may be applied to any control system wherein the control due to two factors is to be modified in accordance with the variations of another factor. While reference is made to a heating supply and a heating medium, it is to be further understood that cooling means or a cooling medium, or humidifier means or de-humidifier means or any air-conditioning equipment may also be controlled, when and as desired.

Referring to the drawing, the outside wall of a room in a house or building is indicated at 10 and the floor thereof is indicated at 11.

The novel means of the present invention comprise a pair of sensitive elements located within the room bounded by the wall 10 and the floor 11 and another sensitive element located so as to be responsive to changes in conditions of the outside air. One of the elements located within the room may be a bi-metallic thermo-element responsive to the dry-bulb temperature within the room and the other inside element may be a hygroscopic element embodying any suitable hygroscopic material such, for example, as human hair.

The element responsive to the outdoor conditions may comprise another bi-metallic element responsive to changes in the temperature of the outside air. This element is connected to a novel resistance varying mechanism of the type disclosed in applicant's Patent No. 2,211,493, issued August 13, 1940, whereby the operation of the two inside elements may be varied with changes in the outside temperature as will be discussed in detail later.

The above-mentioned sensitive elements are so mounted and arranged and inter-connected as to control, in cooperation, suitable contacts of either the open type or the closed type such as a mercury tube contact arrangement, and each set of contacts may be arranged for either two-wire or three-wire connections to the air-conditioning equipment.

In accordance with the present invention, the interior bi-metal element and humidity responsive element are interlinked so as to oppose the action of each other under certain conditions, and means controlled by the exterior bi-metal element are provided, whereby the action of the two interior elements is modified.

As shown in the drawing, the interior bi-metal element comprises a bi-metallic arm 12 fastened at one end 13 thereof to a relatively fixed support 13a. The movable end of the arm 12 is connected by an articulated link 14 to one end of a bell-crank 15 pivoted at 16 to a fixed support 16a.

The humidity responsive element comprises a set of human hairs 17, fastened at one end to clamp 18 which is connected to resilient spring 19 which, in turn, is fastened to some relatively fixed support. The other and movable end of the set is connected to the bell-crank 15 by means of the articulated link 20. A switch element 21, pivoted at 22 is connected at one end 23 to element 18 while the other end of the switch element 21 carries a movable contact 24 cooperating with relatively stationary contacts 25 and 26 to close a respective circuit whereby the air-conditioning equipment (not shown) is in turn controlled. Relatively stationary contacts 25 and 26 may be made adjustable if so desired.

Novel means are now provided for controlling the temperature responsive element 12 and for this purpose a heating element represented by the resistor 27 is located adjacent the bi-metal arm 12, whereby the position of said arm may be varied by the change in temperature brought about by variation of the current through resistor 27. One end of the resistor 27 is connected through conductor 28, switch 29 and conductor 30 to a resistance wire 31 mounted on a curved cam 32 of a novel rheostat 33 which is of the type described in detail in applicant's previously mentioned issued patent. A second curved cam 34 is pivotally mounted at 35 and connected at its insulated end 34a to an articulated link 36 which, in turn, is connected to the free end of an outdoor temperature responsive element such as a bi-metallic strip 37, as shown at 38, which has its other end 39 relatively fixed. The two cams 31 and 34 are urged together by a spring 40 whereby oscillation of cam 34 over the resistance wire 31 mounted on the cam 32 varies the value of said resistance in circuit with resistor 27. A conductor 41 leads to a source of electrical energy 42 which, in turn, is connected to the other end of resistor 27 by means of conductor 43.

The operation of the arrangement is as follows:
Switch arm 21 is controlled by means of the temperature responsive element 12 and the humidity responsive element 17. If the temperature in the room remains constant, the switch 21 is operated upon changes in humidity which vary the length of element 17, whereby switch 21 is actuated by means of element 18 and spring 19.

If the humidity remains constant, the switch element 21 is controlled by the bi-metal element 12, since variation in temperature will flex the bi-metal element, the movement of which is conveyed to the switch element by means of the link 14, bell-crank 15, link 20, hair elements 17 and element 18 to end 23 of the switch element 21.

Variations in both temperature and humidity within the room will actuate both the humidity and temperature responsive elements to, in turn, control the switch element 21 by an amount depending upon the relative temperature and humidity values.

The control of the switch element 21 is further modified by means of the outdoor temperature responsive element 37 in such a manner that upon changes in outdoor temperature, the bi-metal element 37 will flex to actuate cam 34 by means of link 36, whereby rocker-cam 34 rocks with respect to cam 31 so that the amount of resistance 31 in circuit with the resistance 27 is varied. The current passing through the resistor 27, therefore, is varied so that the temperature at the bi-metal element 12 is varied locally in accordance with changes in outdoor temperature. This variation of the local temperature at element 12 varies the position of said element the movement of which is, in turn, conveyed to the switch arm 21. It is to be noted, however, that the local change in temperature at the bi-metal element 12 due to changes in the current through resistor 27 may not under certain conditions actually move switch element 21 since the position of said element is also determined by the relative position of the humidity responsive element 17. The change in current through resistor 27 may, therefore, produce a movement of the bi-metal element 12, which movement is balanced out by a certain movement of the humidity responsive element whereby the value of humidity at which element 17 will actuate the switch element 21, varies with changes in the outside temperature. In other words, the actuation of switch element 21 is determined by the movement of the bi-metal element 12 due to temperature changes within the room, by the movement due to changes in current through element 27 and by the movement produced by element 17 upon changes in humidity.

Novel means are thus provided whereby a condition of comfort within an air-conditioned enclosure is controlled and/or maintained in response to changes in inside temperature, inside humidity and outside temperature, or by any variation in the relative values of these factors.

Although only one embodiment of the invention has been illustrated and described, various changes and modifications in form, materials and relative arrangement of parts, which will now appear to those skilled in the art, may be made without departing from the scope of the invention. Reference is therefore to be had to the appended claims for a definition of the limits of the invention.

What is claimed is:

1. In combination, means responsive to humidity changes in an enclosure, and means for modifying the operation of said humidity responsive means comprising heating means, means responsive to changes in outdoor temperature for varying the effect of said heating means, and means responding to temperatures within said enclosure interposed between said heating means and said humidity responsive means and being mechanically connected with the latter, whereby changes in said heating means are effective to actuate said enclosure temperature responsive means to vary the operation of said humidity responsive means.

2. In combination, means responsive to changes in humidity within an enclosure, means responsive to temperature changes within said enclosure mechanically connected to said humidity responsive means and modifying the operation thereof, means responsive to outdoor temperature for locally varying the temperature at said interior temperature responsive means, whereby the combined effect of said interior temperature and humidity responsive means is varied, and an electrical circuit controlled by said humidity responsive means.

3. In a control device for maintaining a desired effective temperature within an enclosure and for controlling said effective temperature in accordance with changes in outdoor temperature, the combination of a temperature responsive element within said enclosure and having a relatively fixed part and a relatively movable part movable in response to temperature changes within said enclosure, an electric contact device having a relatively fixed contact and a relatively movable contact cooperating therewith, a humidity responsive device responsive to changes in humidity within said enclosure and having one end thereof connected to the movable contact of the contact device and the other end connected to the movable part of the temperature responsive element, whereby the latter modifies the operation of the movable contact by the former, an electrical heating element adjacent said temperature responsive element for modifying the action of the latter, a source of electric current for supplying current to said heating element to heat the same, a variable resistance device outside of said enclosure and connected to said heating element and source for varying the amount of current supplied to said heating element, and an outdoor temperature responsive element connected to said resistance device for actuating the same to vary the current supplied to said heating element in accordance with changes in the outdoor temperature.

4. In combination, means responsive to humidity changes within an enclosure, and means for modifying the operation of said humidity responsive means comprising heating means, means responsive to changes in temperature exterior of said enclosure for varying the effect of said heating means, and means responding to temperatures within said enclosure interposed between said heating means and said humidity responsive means and mechanically connected with the latter, whereby changes in said heating means are effective to actuate said enclosure temperature means to vary the operation of said humidity responsive means.

RALPH R. CHAPPELL.